United States Patent
Gaydos et al.

(10) Patent No.: US 10,880,260 B1
(45) Date of Patent: Dec. 29, 2020

(54) DISTRIBUTED DOMAIN NAME RESOLUTION AND METHOD FOR USE OF SAME

(71) Applicant: Etherweb Technologies LLC, Plano, TX (US)

(72) Inventors: Scott Gaydos, Plano, TX (US); Robert Otting, Plano, TX (US)

(73) Assignee: Etherweb Technologies LLC, Plano, TX (US)

(*) Notice: Subject to any disclaimer, the term of this patent is extended or adjusted under 35 U.S.C. 154(b) by 0 days.

(21) Appl. No.: 16/906,984

(22) Filed: Jun. 19, 2020

Related U.S. Application Data (60) Provisional application No. 62/863,478, filed on Jun. 19, 2019.

(51) Int. Cl.
H04L 29/12 (2006.01)

(52) U.S. Cl.
CPC .......... H04L 61/10 (2013.01); H04L 61/1511 (2013.01)

(58) Field of Classification Search
CPC .............................. H04L 61/10; H04L 61/1511
See application file for complete search history.

(56) References Cited

U.S. PATENT DOCUMENTS

| | | | |
|---|---|---|---|
| 7,681,234 B2 | 3/2010 | Florencio et al. | |
| 8,655,919 B2 | 2/2014 | Cachin et al. | |
| 8,966,276 B2 | 2/2015 | Nanopoulos et al. | |
| 9,058,393 B1 | 6/2015 | Nicks et al. | |
| 10,601,829 B1* | 3/2020 | Nelson | G06F 16/954 |
| 10,721,060 B1* | 7/2020 | Kaizer | H04L 61/1511 |
| 10,747,744 B2* | 8/2020 | Ventura | G06F 3/065 |
| 2004/0133782 A1 | 7/2004 | Sander et al. | |
| 2005/0166263 A1 | 7/2005 | Nanopoulos et al. | |
| 2007/0006305 A1 | 1/2007 | Florencio et al. | |
| 2009/0037491 A1 | 2/2009 | Cachin et al. | |
| 2010/0212017 A1 | 8/2010 | Li et al. | |
| 2014/0245020 A1 | 8/2014 | Buldas et al. | |
| 2015/0365242 A1 | 12/2015 | Gault et al. | |
| 2016/0087798 A1 | 3/2016 | Campbell | |
| 2016/0191243 A1* | 6/2016 | Manning | H04L 9/321 |
| | | | 713/168 |
| 2016/0321769 A1 | 11/2016 | McCoy et al. | |
| 2017/0075938 A1 | 3/2017 | Black et al. | |
| 2017/0132621 A1 | 5/2017 | Miller et al. | |
| 2017/0236123 A1 | 8/2017 | Ali et al. | |

(Continued)

*Primary Examiner* — Michael Won
(74) *Attorney, Agent, or Firm* — Scott Griggs; Griggs Bergen LLP (57) ABSTRACT

A system for distributed domain name address resolution, including top-level domain name address resolution, and method for use of the same are disclosed. In one embodiment of the system, a blockchain stores distributed domain names with respective Internet Protocol address information. A smart contract, which defines shared logic to execute operations on the blockchain, runs on the blockchain. With respect to distributed domain names, the system may perform read operations to identify the Internet Protocol address information, create operations to create a new distributed domain name with respective Internet Protocol address information, delete operations to remove a distributed domain name, and update operations to update the mapping between a distributed domain name and the respective Internet Protocol address information.

14 Claims, 8 Drawing Sheets

(56) References Cited

U.S. PATENT DOCUMENTS

| | | | |
|---|---|---|---|
| 2017/0243217 A1* | 8/2017 | Johnsrud | G06Q 20/4014 |
| 2018/0075527 A1 | 3/2018 | Nagla et al. | |
| 2018/0129956 A1 | 3/2018 | Saxena et al. | |
| 2018/0101557 A1* | 4/2018 | Ventura | G06F 11/1458 |
| 2018/0287917 A1 | 10/2018 | Schmid | |
| 2018/0287997 A1* | 10/2018 | Li | H04L 61/1511 |
| 2018/0302366 A1* | 10/2018 | Kaliski, Jr. | H04L 61/3055 |
| 2018/0337882 A1* | 11/2018 | Li | H04L 61/35 |
| 2018/0375716 A1* | 12/2018 | Huque | H04L 61/6009 |
| 2019/0005469 A1* | 1/2019 | Dhupkar | G06Q 20/06 |
| 2019/0253252 A1* | 8/2019 | Qiu | H04L 9/3239 |
| 2019/0333054 A1* | 10/2019 | Cona | H04W 12/00518 |
| 2020/0021446 A1* | 1/2020 | Roennow | H04L 63/0478 |
| 2020/0076828 A1* | 3/2020 | Nainar | H04L 63/126 |
| 2020/0076884 A1* | 3/2020 | Li | H04L 9/3073 |
| 2020/0125738 A1* | 4/2020 | Mahatwo | G06F 16/2379 |
| 2020/0127965 A1* | 4/2020 | Oron | G06F 16/1805 |
| 2020/0145373 A1* | 5/2020 | Richardson | G06Q 10/10 |
| 2020/0219150 A1* | 7/2020 | Johnston | G06Q 30/0282 |
| 2020/0226629 A1* | 7/2020 | Lawrence | G06Q 30/0201 |
| 2020/0235943 A1* | 7/2020 | Salimi | H04L 9/3239 |
| 2020/0266989 A1* | 8/2020 | Krcmaricic-Barackov | H04W 60/00 |

\* cited by examiner

DISTRIBUTED DOMAIN NAME RESOLUTION AND METHOD FOR USE OF SAME

PRIORITY STATEMENT & CROSS-REFERENCE TO RELATED APPLICATIONS

This application claims priority from U.S. Application Ser. No. 62/863,478, entitled "Distributed Domain Name Resolution and Method for Use of Same" and filed on Jun. 19, 2019, in the names of Scott Gaydos and Robert Otting; which is hereby incorporated, in entirety, by reference, for all purposes.

TECHNICAL FIELD OF THE INVENTION

This invention relates, in general, to domain names and domain suffixes and, in particular, to distributed domain address resolution for domain names, such as top-level domain names and the like, as well as and the naming and management thereof.

BACKGROUND OF THE INVENTION

On the Internet, a domain name is a label that identifies a network domain, which may be a distinct group of computers under a central administration or authority. With respect to top-level domain names as an example, a list of all valid top-level domain names is maintained by the Internet Assigned Numbers Authority (IANA) and is updated from time to time. The number of top-level domain names, however, is limited. As a result of the continued exponential growth of the Internet, there is a need for domain address resolution for top-level domain names and the like as well as and the naming and management thereof.

SUMMARY OF THE INVENTION

It would be advantageous to achieve systems and methods for providing domain address resolution for domain names, including top-level domain names and the like, as well as and the naming and management thereof. It would be desirable to enable a decentralized, distributed and public digital ledger and software solution that would provide enhanced domain name management and naming. To better address one or more of these concerns, a system for distributed domain name address resolution and method for use of the same are disclosed.

In one embodiment of the system, a blockchain stores distributed domain names with respective Internet Protocol (IP) address information. A smart contract, which defines shared logic to execute operations on the blockchain, runs on the blockchain. With respect to distributed domain names, the system may perform read operations to identify the IP address information, create operations to create a new distributed domain name with respective IP address information, delete operations to remove a distributed domain name, and update operations to update the mapping between a distributed domain name and the respective IP address information. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 4 is a functional flow diagram depicting one detailed embodiment of a create operation methodology in a multi-cloud architecture for distributed domain address resolution for top-level domain names and the like;

FIG. 5 is a functional flow diagram depicting one detailed embodiment of a create operation methodology for distributed domain address resolution for top-level domain names and the like;

FIG. 6 is a functional flow diagram depicting one detailed embodiment of a read operation methodology for distributed domain address resolution for top-level domain names and the like;

FIG. 7 is a functional flow diagram depicting one detailed embodiment of a delete operation methodology for distributed domain address resolution for top-level domain names and the like;

FIG. 8 is a functional flow diagram depicting one detailed embodiment of an update operation methodology for distributed domain address resolution for top-level domain names and the like; and FIG. 9 is a functional flow diagram depicting one detailed alternate embodiment of an operational methodology for distributed domain address resolution for top-level domain names and the like.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
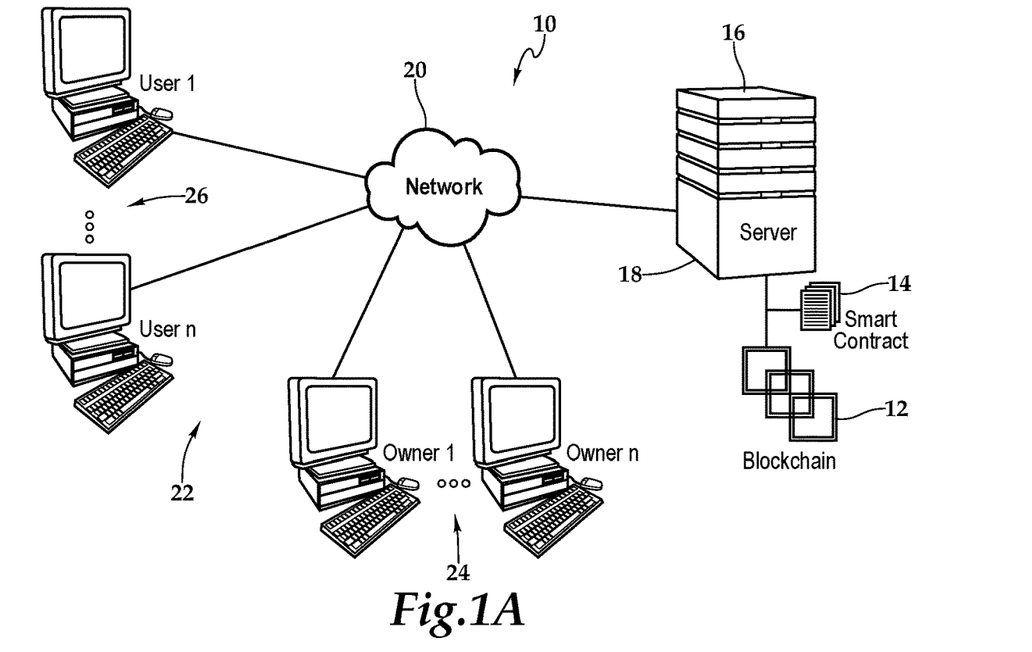
FIG. 1A is schematic network diagram depicting one embodiment of a system for distributed domain address resolution for top-level domain names and the like, according to the teachings presented herein.

Referring initially to FIG. 1A, therein is depicted one embodiment of a system for domain address resolution for distributed domain names, such as top-level domain names and the like, which is schematically illustrated and designated 10. A blockchain 12 stores domain names, such as distributed top-level domain names, with respective IP address information. The blockchain may be embodied as a growing list of records, called blocks, which are linked using cryptography. Each block contains a cryptographic hash of the previous block, a timestamp, and transaction data, for example. A smart contract 14 runs on the blockchain 12. The smart contract 14 may be embodied as a computer protocol intended to digitally facilitate, verify, or enforce the negotiation or performance of a contract. In general, smart contracts allow the performance of credible transactions without third parties. These transactions are trackable and irreversible, and the contractual clauses may be made partially or fully self-executing, self-enforcing, or both. One aim of smart contracts is to provide security that is superior to traditional contract law and to reduce other transaction costs associated with contracting. As shown, in some embodiments, the smart contract 14 defines the shared logic to execute operations on the blockchain 12. The blockchain and the smart contract 14 may be embodied on a server 16, which is one embodiment of a distributed domain name server (DDNS 18). A network 20, such as the Internet, connects customers 22, including domain name owners 24 and domain name users 26, to the server 16.

The system 10 may perform domain name resolution utilizing the blockchain 12 and the smart contract 14. With respect to distributed top-level domain names, as a non-limiting example, the system 10 may perform read operations to identify the IP address information, create operations to create a new distributed top-level domain name with respective IP address information, delete operations to remove a distributed top-level domain name, and update operations to update the mapping between a distributed top-level domain name and the respective IP address information. Similar operations and functionality are applicable to other types of domain names.

Figure 1B:
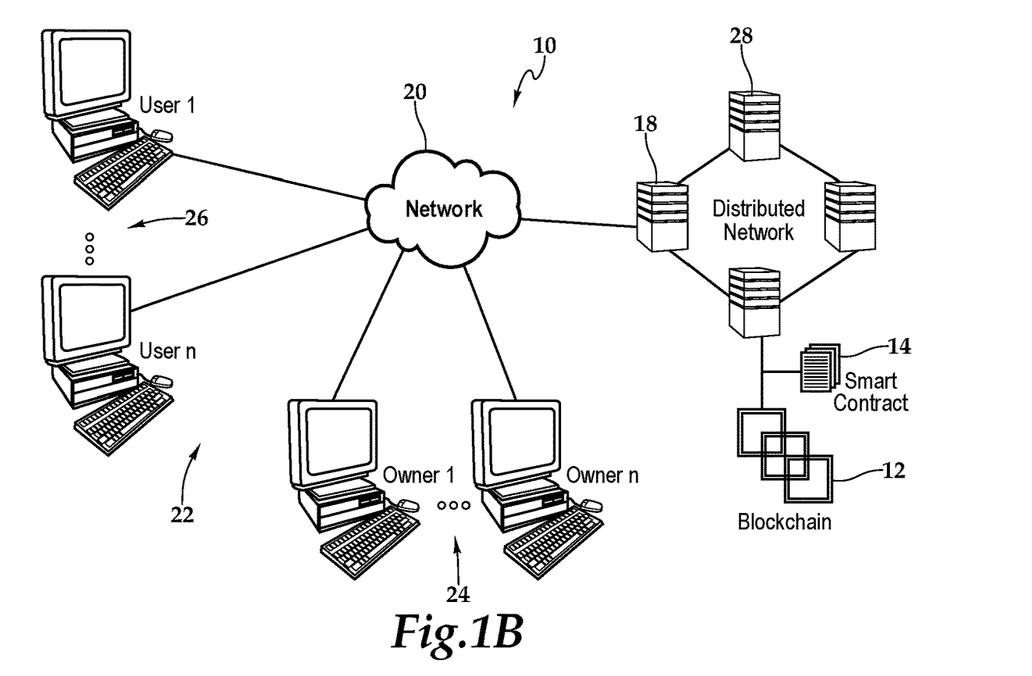
FIG. 1B is a schematic network diagram depicting another embodiment of a system for distributed domain address resolution for top-level domain names and the like, according to the teachings presented herein.

FIG. 1B depicts another embodiment of the system 10 that executes domain address resolution for domain names, including top-level domain names and the like. Similar to FIG. 1A, the blockchain 12 stores domain names, such as distributed top-level domain names, with respective IP address information. The smart contract runs on the blockchain 12. The blockchain 12 and the smart contract 14 may be embodied, however, on a distributed network 28, which is also one embodiment of the DDNS 18. The network 20 connects customers 22 to the distributed network 28.

Figure 2A:
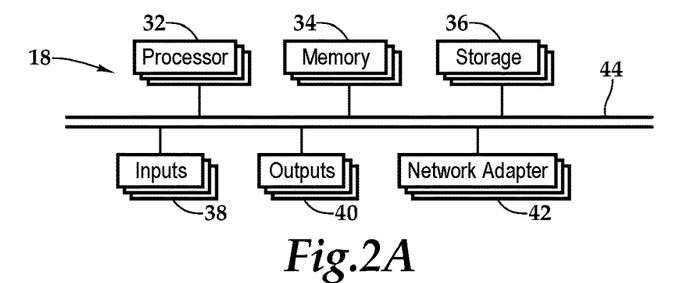
FIG. 2A is a functional block diagram depicting one embodiment of a domain name server node presented in FIGS. 1A and 1B.

Referring now to FIG. 2A, one embodiment of the DDNS 18 as one or more computing devices includes a processor 32, memory 34, storage 36, inputs 38, outputs 40, and network adaptors 42 interconnected with various buses in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 32 may process instructions for execution within the DDNS 18, including instructions stored in the memory 34 or in storage 36. The memory 34 stores information within the computing device. In one implementation, the memory 34 is a volatile memory unit or units. In another implementation, the memory 34 is a non-volatile memory unit or units. Storage 36 includes capacity that is capable of providing mass storage for the DDNS 18. Various inputs 38 and outputs 40 provide connections to and from the DDNS 18, wherein the inputs 38 are the signals or data received by the DDNS 18, and the outputs 40 are the signals or data sent from the DDNS 18. The network adaptor 42 or network adaptors couple the DDNS to a network such that the DDNS 18 may be part of a network of computers, a local area network (LAN), a wide area network (WAN), an intranet, a network of networks, or the Internet, for example.

In order to connect a node, such as the DDNS 18, to the DDNS network and serve DTLD records back customers 22, the DDNS 18 must be connected to the network 20. To do this, in one implementation, there are two possible interfaces for the network adapter 42; namely, an Ethernet adapter and an optical adapter. An Ethernet adapter is a more traditional hardware device that carries internet using electrical signals. As such it is susceptible to electromagnetic interference and is not able to arbitrate the signal very far. In optical networking, both problems are avoided by the use of light as a transfer medium. As well as being more reliable, fiber optics can transfer at a rate of up to 31% faster which makes it more useful in high throughput server applications.

The memory 34 and storage 36 are accessible to the processor 32 and include processor-executable instructions that, when executed, cause the processor 32 to execute a series of operations. In one embodiment of first processor-executable instructions, the processor-executable instructions cause the processor to perform a read operation. More specifically, in one implementation, the processor-executable instructions cause the processor to create a smart contract and a block chain that execute domain address resolution for domain names, including top-level domain names and the like. In one embodiment of second processor-executable instructions, the processor-executable instructions cause the processor to receive a domain name request and then analyze the domain name request. If the domain name request is a standard domain name request, then the processor-executable instructions cause the processor to serve with access to a standard domain name file. On the other hand, if the domain name request is a distributed domain name request, then the processor is caused to query the blockchain for the distributed domain name from the smart contract. In one embodiment, the distributed domain name request includes the distributed domain name and IP address information. The processor-executable instructions then cause the processor to receive a read response with IP address information corresponding to the distributed domain name.

In one embodiment of third processor-executable instructions, the processor-executable instructions cause the processor to perform a create operation. More specifically, in one implementation, the processor-executable instructions cause the processor to receive a distributed domain name request. As previously discussed, the distributed domain name request may include the distributed domain name and IP address information. The processor is then caused to query the blockchain for the distributed domain name from the smart contract prior to the processor being caused to receive a read response indicating availability of the distributed domain name. The processor-executable instructions may then cause the processor to request from the smart contract a blockchain mapping of the distributed domain name. Finally, the processor receives a mapping response indicating the blockchain mapping of the distributed domain name to the IP address information.

In one embodiment of fourth processor-executable instructions, the memory includes processor-executable instructions that, when executed, cause the processor to perform an update operation. More specifically, in one implementation, the processor-executable instructions cause the processor to receive a request to update a distributed domain name. As previously discussed, the request may include existing IP address information and updated IP address information. The processor-executable instructions are then caused to query the blockchain for the distributed domain name from the smart contract prior to the processor receiving a read response with existing IP address information corresponding to the distributed domain name. The processor may then request from the smart contract an updated blockchain mapping of the distributed domain request. The processor then receives a mapping response indicating the blockchain mapping of the distributed domain name to the updated IP address information.

In one embodiment of fifth processor-executable instructions, the memory includes processor-executable instructions that, when executed, cause the processor to perform a delete operation. In one implementation of the performing of the delete operation, the processor-executable instructions cause the processor to receive a request to delete a distributed domain name. The processor is then caused to query the blockchain for the distributed domain name from the smart contract. The processor receives a read response with IP address information corresponding to the distributed domain name. The processor-executable instructions then cause the processor to request from the smart contract deletion of the distributed domain name from the blockchain. The processor then receives a deletion response indicating deletion of the distributed domain name from the blockchain.

Figure 2B:
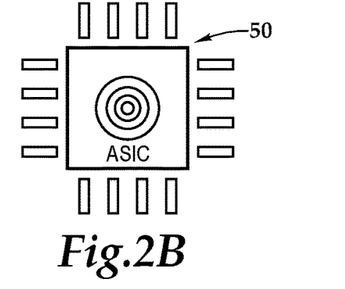
FIG. 2B is schematic diagram depicting one embodiment of an application specific integrated circuit that may form a portion of the domain name server node presented in FIG. 2A.

FIG. 2B depicts one embodiment of an application specific integrated circuit (ASIC) 50 that may form a portion of DDNS 18 presented in FIG. 2A. The ASIC may be used for realizing a software algorithm as a piece of specialized hardware that trades its general-purpose abilities for the ability to compute a specific algorithm very efficiently. A single ASIC unit can produce hashrates up to 500 MH/s (mega-hashes per second). By using an ASIC, in some exemplary embodiments, a blockchain miner is able to provide verifications of chain transactions much quicker than another miner using a CPU at less than 1 MH/s (Central Processing Unit) or even a GPU at around 30 MH/s (Graphics Processing Unit).

Figure 2C:
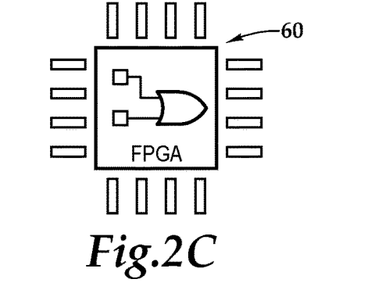
FIG. 2C is schematic diagram depicting one embodiment of a field programmable gate array that may form a portion of the domain name server node presented in FIG. 2A.

FIG. 2C depicts one embodiment of a field programmable gate array (FPGA) 60 that may form a portion of the DDNS 18 presented in FIG. 2A. The FPGA 60 may be used to mine blocks (verify transactions) on the chain. An FPGA works by effectively mimicking a "gate" or piece of hardware through the usage of an array of more simple, configurable pieces hardware that can be reconfigured according to different specifications, hence the name "field programmable". In this way, it is a sort of hybrid between a CPU miner (full software algorithm) and an ASIC miner (full hardware algorithm). Although this method hasn't been tested as much, some embodiments have benchmarked hashrates around 400 MH/s. In order to verify transactions on the chain, miners are required to "mine" or compute a mathematical algorithm known as SHAD3_256 or, more specifically, Keccack256. In the algorithm, each block is verified according to its header, a nonce, and the data. The nonce is a random number that is generated (using its own different algorithm), that when used in the Keccack256 hashing algorithm along with the header data, will produce sufficient evidence that the block has enough computation performed within it. Taking this into account, the lengthy computation of the algorithm lends itself to more efficient hardware being used, such as an ASIC or FPGA to perform this computation more optimized than, for example, a general-purpose CPU.

At a fundamental level, a DDNS 18, in some embodiments, may be a node that serves a string of text representing an IP address that the user has requested. Thinking about this as just data is related to the abstraction of the chain implementation from the system itself; namely, cross chain support in the DTLD and DDNS system is a trivial solution. In order to do so, another chain supporting smart contracts with persistent data storage needs to be identified, such as HyperLedger, EOS, or NEO. Using one of these to mock the same functionality as we have described using in the Ethereum blockchain (ETH) will produce the same results with our smart contract. To operate this in parallel with ETH, we would need to first implement our current smart contract on that blockchain, deploy a node servicing DDNS records from the blockchain, and maintain synchronization with it when performing our standard operations against the network as a whole. For instance, when a Customer creates a new DDNS record, this record would be inserted in to both blockchains at the same time and thus replicated across both of them. When a customer attempts to retrieve record and resolve the IP address, the customer will not necessarily be serviced any one blockchain and can now Instead retrieve the record from any chain fully synced to the network. It should be appreciated that FIG. 2A, FIG. 2B, and FIG. 2C present only some embodiments of the hardware that may be utilized with the system 10 that executes domain address resolution for domain names, such as top-level domain names and the like. Other hardware, firmware, and software architectures are within the teachings presented herein.

Figure 3:
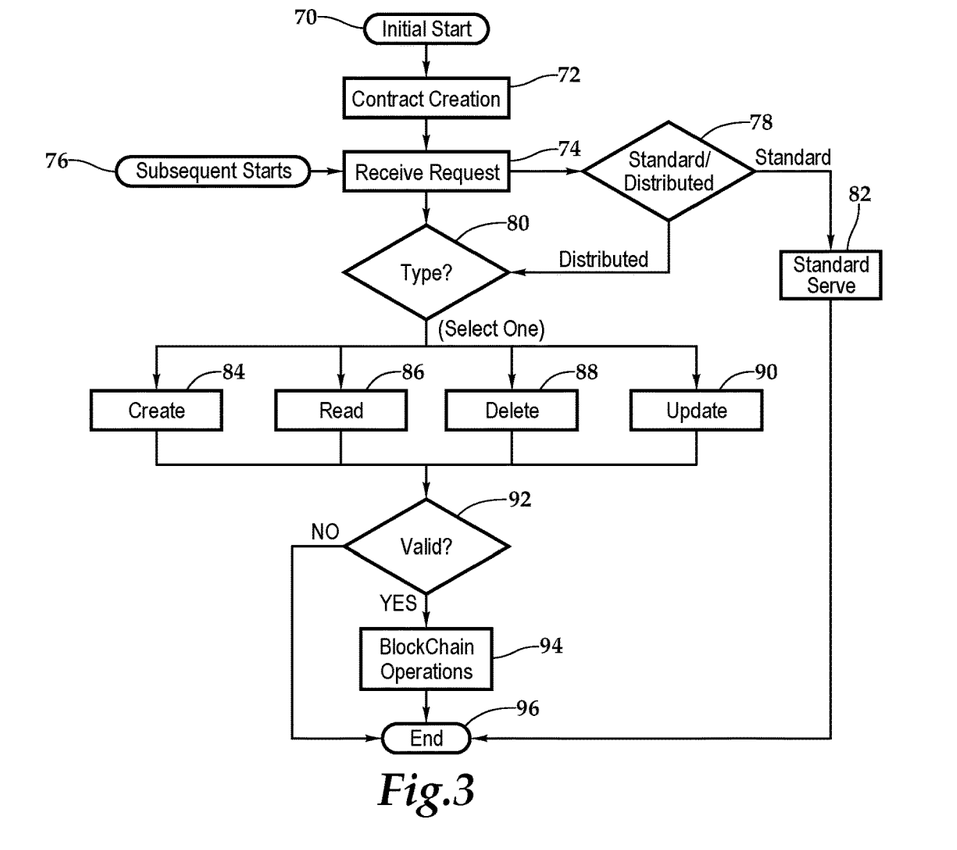
FIG. 3 is a flow chart depicting one embodiment of a method for distributed domain address resolution for top-level domain names and the like, according to the teachings presented herein.

FIG. 3 depicts one embodiment of a method for domain address resolution for domain names, such as top-level domain names and the like, according to the teachings presented herein. At block 70, the methodology begins with an initial start where the smart contract and blockchain are crated. The methodology then advances to block 74, where a request is received by a customer. Block 74 may also occur following, subsequent start block 76. Once the blockchain and smart contract are initially created at block 72, all subsequent starts of the methodology begin at subsequent start block 76. At decision block 78, the request is analyzed to determine if it is distributed or standard. If the request is distributed, then the methodology advances to decision block 80, where the request is analyzed to determine type. If the request is standard, then the methodology advances to block 82 prior to ending at block 96. That is, if the domain name request comprises a standard domain name request, such as *.com or *.net with respect top-level domains, then the methodology serves with access to a standard domain name file.

Returning to decision block 80, as shown in blocks 84, 86, 88, 90, the methodology may perform create operations to create a new distributed top-level domain name with respective IP address information, read operations to identify the IP address information, delete operations to remove a distributed top-level domain name, and update operations to update the mapping between a distributed top-level domain name and the respective IP address information. If the request is validated at decision block 92, the necessary blockchain operations are executed at block 94 prior to the methodology ending at block 96. On the other hand, if the request is invalid, then the methodology advances immediately to block 96.

Figure 4:
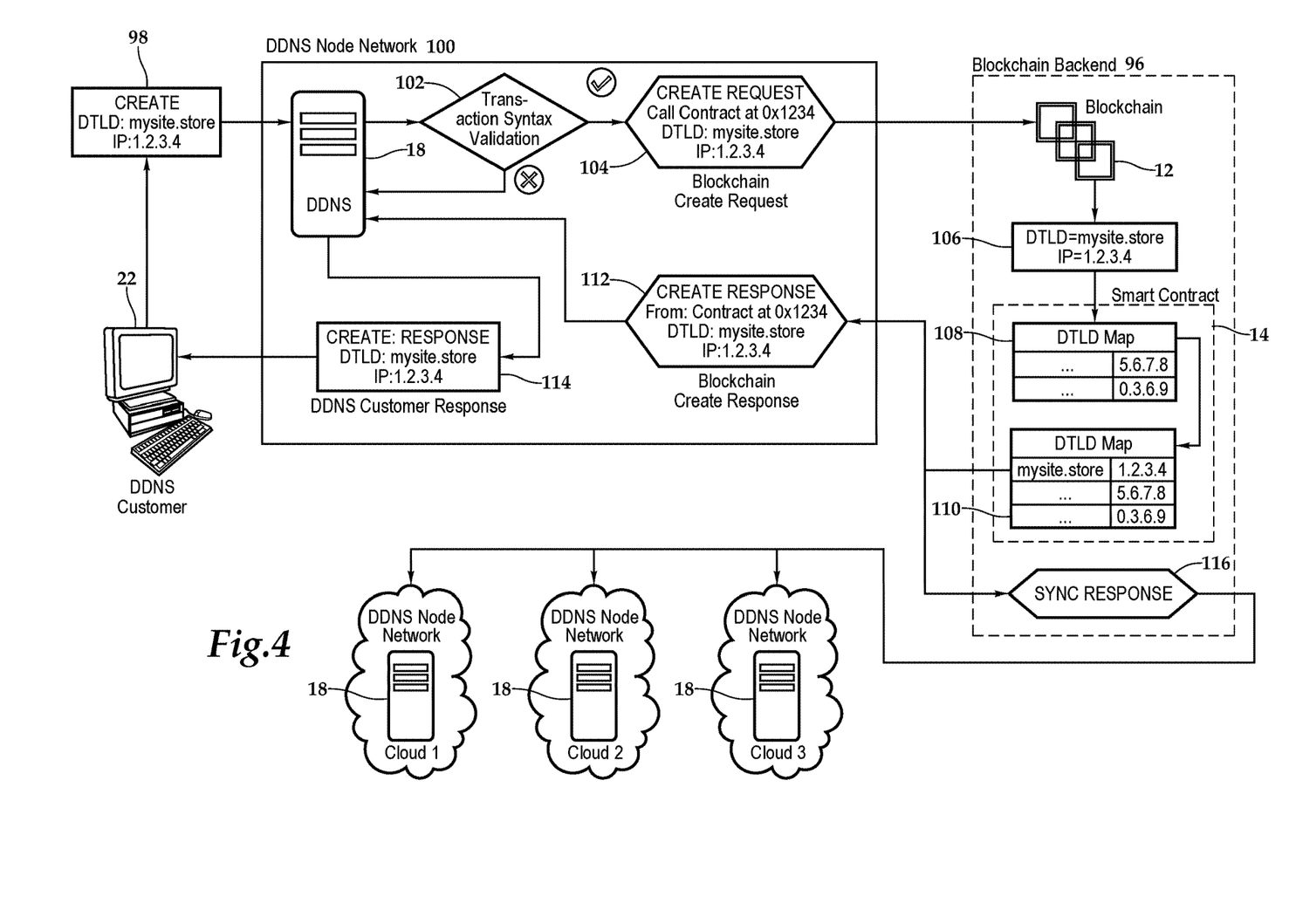

FIG. 4 depicts one embodiment of a create operation in a multi-cloud architecture. It should be appreciated that FIG. 4 will be described with respect to the creation of a distributed top-level domain name; however, the teachings presented herein are applicable to all types of domain names. At block 98, the DDNS customer submits a DTLD create request with the DDNS 18 which forms a portion of a DDNS node network 100. The DDNS 18 picks up the DTLD create request, which includes creating a distributed top-level domain name called mysite.store with IP address information, including 1.2.3.4. At decision block 102, transaction syntax is validated with successful validation advancing the methodology to block 104 and an unsuccessful validation returning the methodology to the DDNS 18. At block 104, the DDNS 18 calls a transaction operation including a blockchain create request at a smart contract address (e.g., 0x1234) with blockchain transaction request data (e.g., mysite.store; IP 1.2.3.4). The blockchain 12 receives the blockchain create request and at block 106, obtains the necessary blockchain transaction request data (e.g., mysite.store; IP 1.2.3.4). With respect to the blockchain 12, which forms a portion of a blockchain backend 96, and the smart contract 14, the blockchain 12 queries the DTLD at the smart contract 14 to execute IP address mapping with the transaction request data. As shown by comparing DTLD map 108 and DTLD map 110 within the operations of the smart contract 14, the smart contract 14 modifies the IP address mapping to reflect the blockchain transaction request data (e.g., mysite.store; IP 1.2.3.4).

The blockchain 12 then creates a response at block 112 that confirms the necessary blockchain transaction has been created. The DDNS 18 receives the create response and at block 114, a further confirmation is provided to the DDNS customer 22. In parallel to the operations reflected by block 112 and the block 114, at block 116, a synchronization response is provided by the blockchain to any other DDNS 18 connected within the cloud architecture, including the depicted cloud 1, cloud 2, and cloud 3. This operation appropriately propagates the necessary blockchain transaction that has been created.

Figure 5:
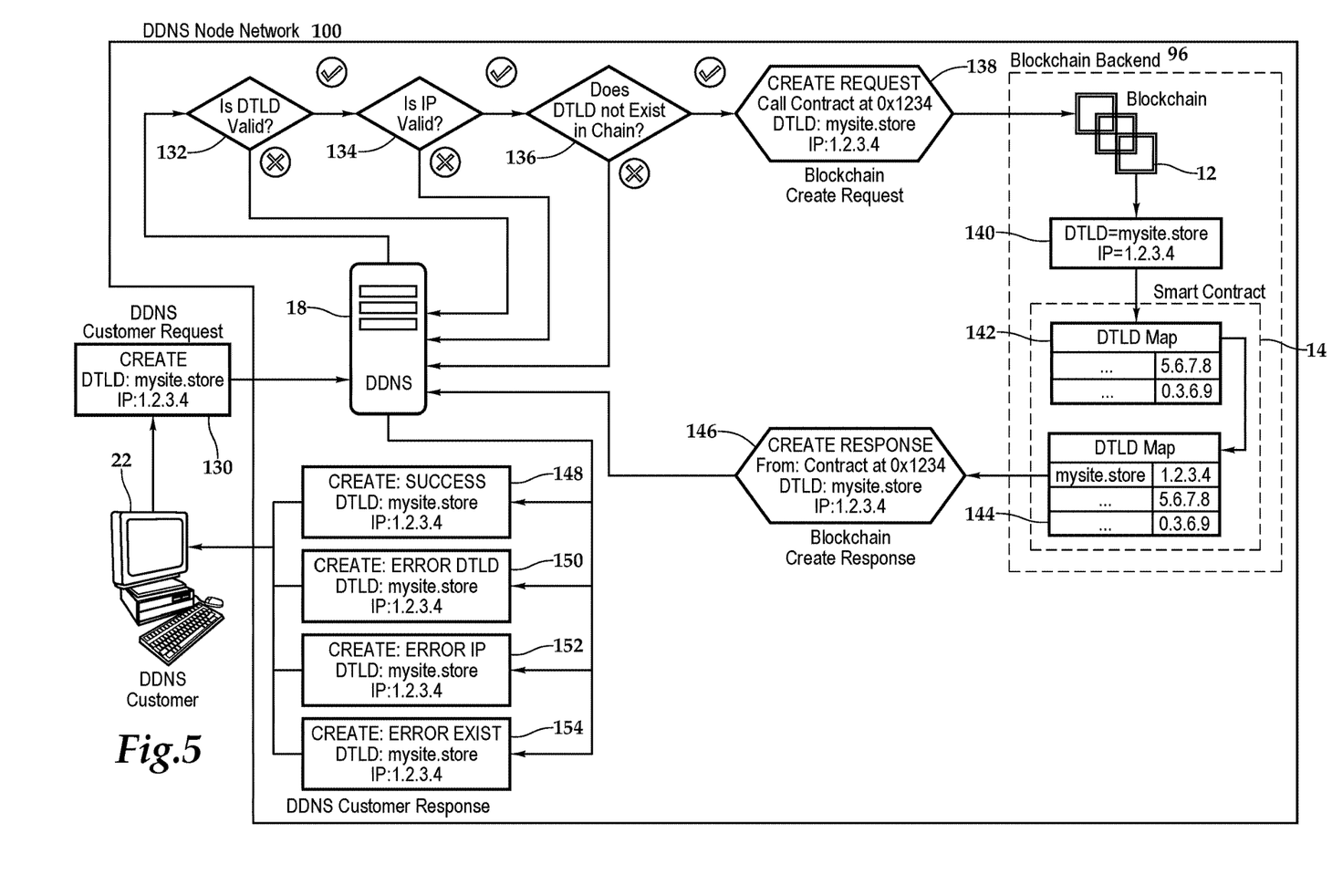

FIG. 5 depicts one embodiment of an operation to create a new distributed top-level domain name with respective IP address information. It should be appreciated that FIG. 5 will be described with respect to the creation of a distributed top-level domain name; however, the teachings presented herein are applicable to all types of domain names. At block 130, the DDNS customer submits a DTLD create request with the DDNS 18 which forms a portion of the DDNS node network 100. The DDNS 18 picks up the DTLD create request, which includes creating a distributed top-level domain name called mysite.store with IP address information, including 1.2.3.4. At decision blocks 132, 134, 136, transaction syntax is validated. In one implementation, this includes verifying that the DTLD is valid (block 132), the IP address information is valid (block 134), and the availability of the DTLD (block 136). Only if all three components of the transaction syntax are validated does the methodology advance to block 138. If any one of the transaction syntax components are not validated, then the methodology returns to the DDNS 18. As shown at blocks 150, 152, 154, in an instance of invalidation, an error message is provided by the DDNS 18 to the DDNS customer 22. The error message at block 150 corresponds to the decision block 132 as the error message at block 152 corresponds to the decision block 134, and the error message 154 corresponds to the decision block 136.

At block 138, the DDNS 18 calls a transaction operation including a blockchain create request at a smart contract address (e.g., 0x1234) with blockchain transaction request data (e.g., mysite.store; IP 1.2.3.4). The blockchain 12, which forms a portion of a blockchain backend 96, receives the blockchain create request and at block 140, obtains the necessary blockchain transaction request data (e.g., mysite.store; IP 1.2.3.4). With respect to the blockchain 12 and the smart contract 14, the blockchain 12 queries the DTLD at the smart contract 14 to execute IP address mapping with the transaction request data. As shown by comparing DTLD map 142 and DTLD map 144 within the operations of the smart contract 14, the smart contract 14 modifies the IP address mapping to reflect the blockchain transaction request data (e.g., mysite.store; IP 1.2.3.4). The blockchain 12 then creates a response at block 146 that confirms the necessary blockchain transaction has been created. The DDNS 18 receives the create response and at block 148, a further confirmation is provided to the DDNS customer 22.

Figure 6:
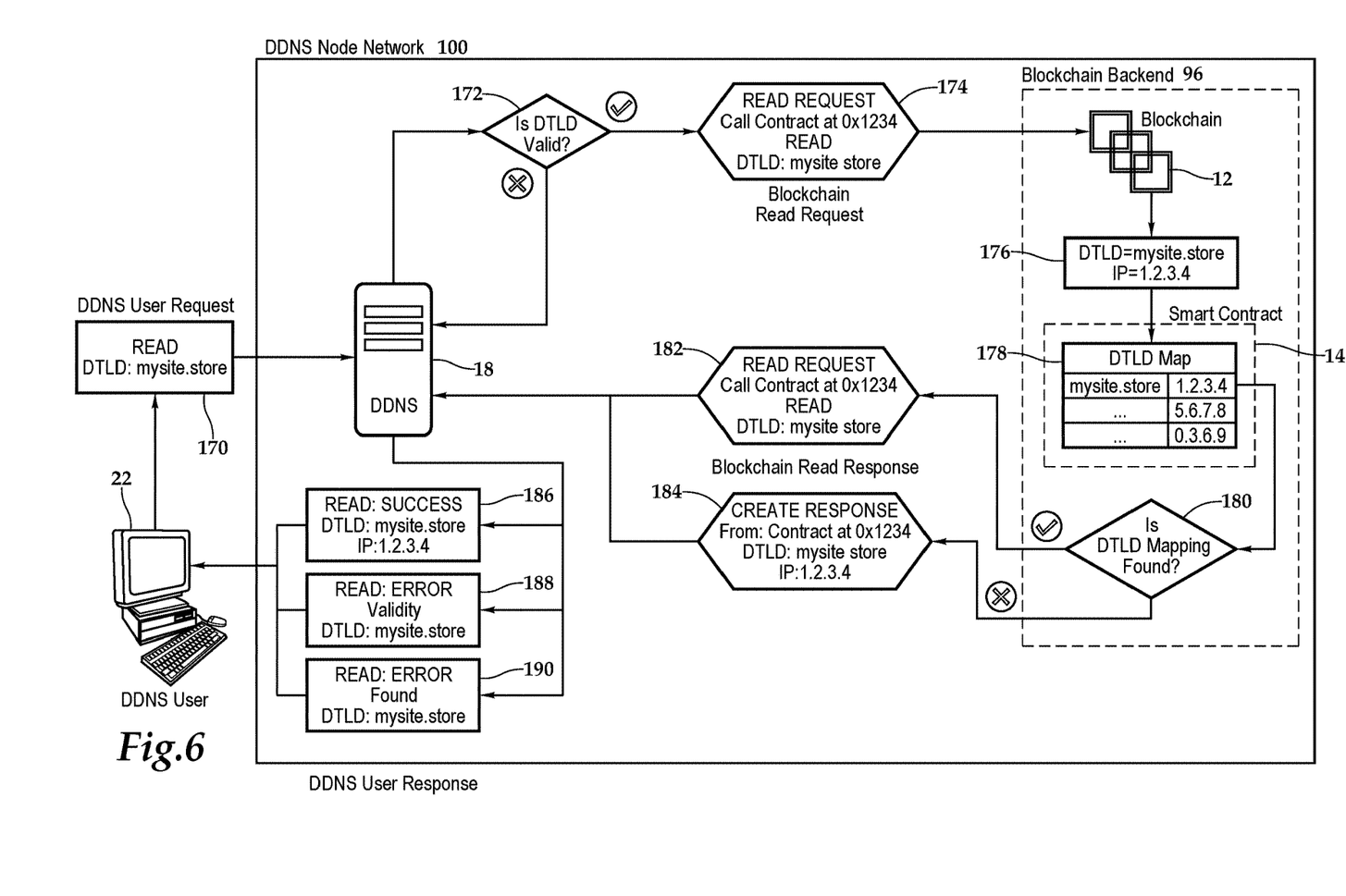

FIG. 6 depicts one embodiment of an operation to execute read operations to identify the IP address information. It should be appreciated that FIG. 6 will be described with respect to the reading of a distributed top-level domain name; however, the teachings presented herein are applicable to all types of domain names. At block 170, the DDNS customer 22 submits a DTLD read request with the DDNS 18 which forms a portion of the DDNS node network 100. The DDNS 18 picks up the DTLD read request, which includes reading a distributed top-level domain name called mysite.store. At decision blocks 172, transaction syntax is validated; namely, verifying that the DTLD is valid. Only if this component of the transaction syntax is validated does the methodology advance to block 174. If transaction syntax component is not validated, then the methodology returns to the DDNS 18. As shown at block 188, in an instance of invalidation, an error message is provided by the DDNS 18 to the DDNS customer 22.

At block 174, the DDNS 18 calls a transaction operation including a blockchain read request at a smart contract address (e.g., 0x1234) with blockchain transaction request data (e.g., mysite.store). The blockchain 12, which forms a portion of a blockchain backend 96, receives the blockchain read request and at block 176, obtains the necessary blockchain transaction request data (e.g., mysite.store). With respect to the blockchain 12 and the smart contract 14, the blockchain 12 queries the DTLD at the smart contract 14 to read IP address mapping with the transaction request data. If the corresponding IP address information (e.g., IP 1.2.3.4) is found at DTLD map 178, then at decision block 180, a read request is provided by advancing the methodology to block 182. As shown, at block 182, the blockchain 12 creates a response that confirms the necessary blockchain transaction has been read with the appropriate IP address information (e.g., IP 1.2.3.4). The DDNS 18 receives the read response and at block 186, a further confirmation is provided to the DDNS customer 22 with the appropriate IP address information (e.g., IP 1.2.3.4) corresponding to the read request. On the other hand, at decision block 180, if the DTLD mapping is not found, then an error message is created by way of block 184 and block 190.

Figure 7:
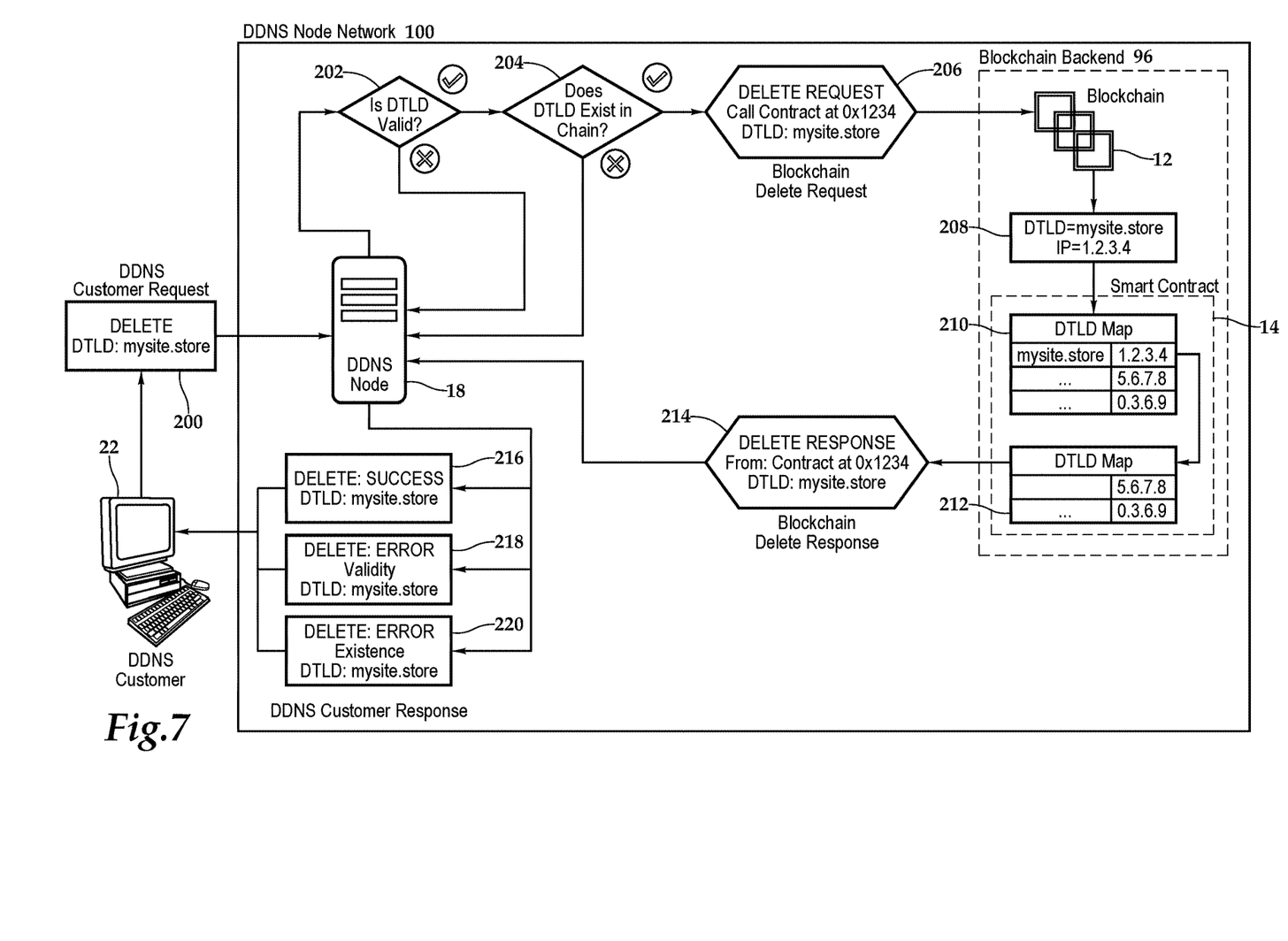

FIG. 7 depicts one embodiment of an operation to delete operations to remove a distributed top-level domain name. It should be appreciated that FIG. 7 will be described with respect to the deletion of a distributed top-level domain name; however, the teachings presented herein are applicable to all types of domain names. At block 200, the DDNS customer 22 submits a DTLD delete request with the DDNS 18 which forms a portion of the DDNS node network 100. The DDNS 18 picks up the DTLD delete request, which includes deleting a distributed top-level domain name called mysite.store. At decision blocks 202, 204, transaction syntax is validated. In one implementation, the validity of the DTLD (block 202) is validated and the existence of the DTLD in the blockchain (block 204) is validated. Only if both components of the transaction syntax are validated does the methodology advance to block 206. If any one of the transaction syntax components are not validated, then the methodology returns to the DDNS 18. As shown at blocks 218, 220, in an instance of invalidation, an error message is provided by the DDNS 18 to the DDNS customer 22. The error message at block 218 corresponds to the decision block 202 and the error message at block 220 corresponds to the decision block 204.

At block 206, the DDNS 18 calls a transaction operation including a blockchain delete request at a smart contract address (e.g., 0x1234) with blockchain transaction request data (e.g., mysite.store). The blockchain 12, which forms a portion of a blockchain backend 96, receives the blockchain delete request and at block 208, obtains the necessary blockchain transaction request data (e.g., mysite.store) and identifies the necessary IP address information (IP 1.2.3.4). With respect to the blockchain 12 and the smart contract 14, the blockchain 12 queries the DTLD at the smart contract 14 to execute the data deletion. As shown by comparing DTLD map 210 and DTLD map 212 within the operations of the smart contract 14, the smart contract modifies the DTLD map to reflect the deletion and removal of the blockchain transaction request data (e.g., mysite.store; IP 1.2.3.4). The blockchain 12 then creates a response at block 214 that confirms the necessary blockchain transaction, i.e., deletion, has been executed. The DDNS 18 receives the delete response and at block 216, a further confirmation is provided to the DDNS customer 22.

Figure 8:
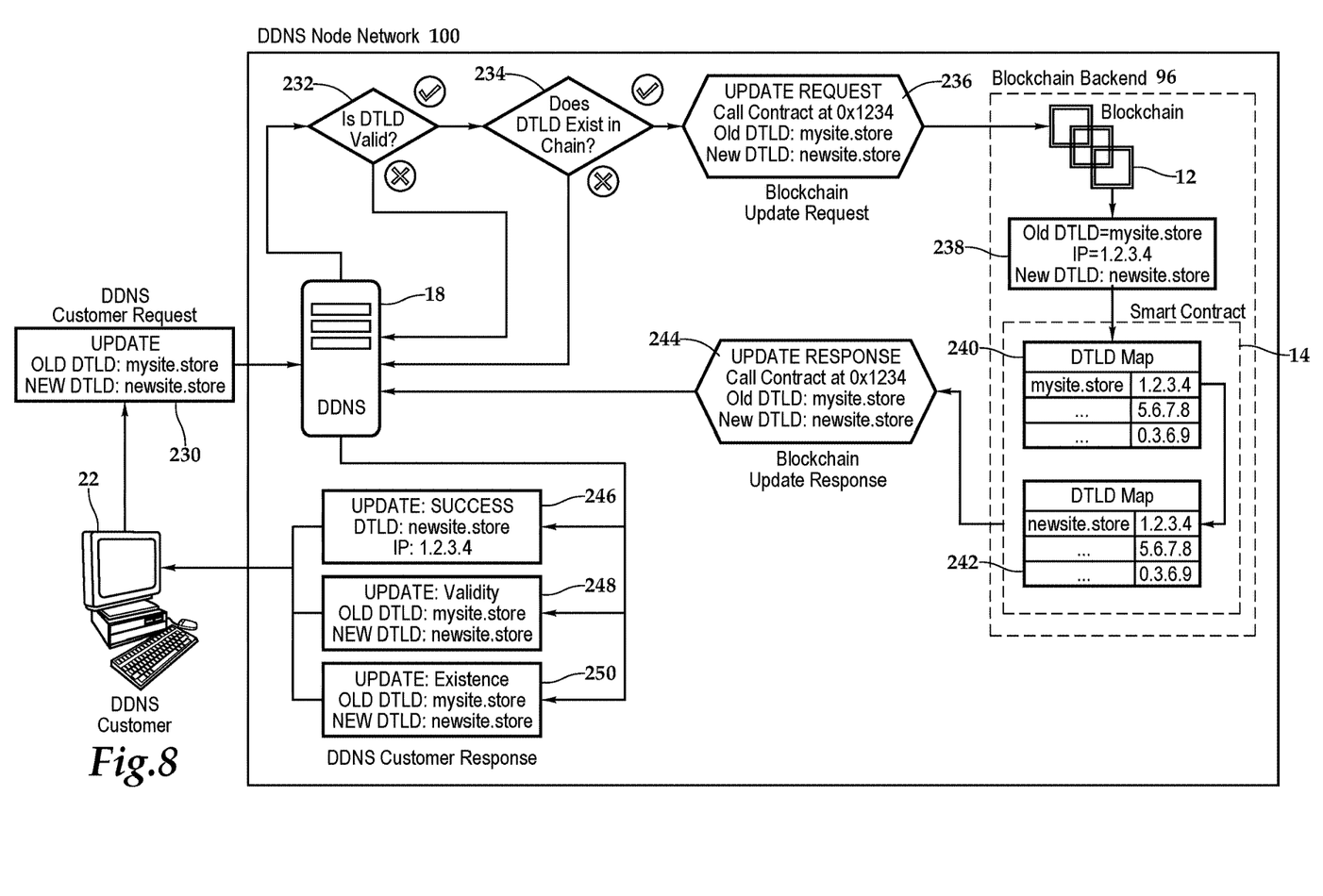

FIG. 8 depicts one embodiment of an operation to update the mapping between a distributed top-level domain name and the respective IP address information. It should be appreciated that FIG. 8 will be described with respect to the update (e.g., old domain name to new domain name) of a distributed top-level domain name; however, the teachings presented herein are applicable to all types of domain names. At block 230, the DDNS customer 22 submits a DTLD update request with the DDNS 18 which forms a portion of the DDNS node network 100. The DDNS 18 picks up the DTLD update request, which includes updating a distributed top-level domain name called mysite.store (OLD DTLD) to be newsite.store (NEW DTLD). At decision blocks 232, 234, transaction syntax is validated. In one implementation, validity of the DTLD is verified (block 232) and the existence of the DTLD in the blockchain (block 234). Only if both components of the transaction syntax are validated does the methodology advance to block 236. If any one of the transaction syntax components are not validated, then the methodology returns to the DDNS 18. As shown at blocks 248, 250, in an instance of invalidation, an error message is provided by the DDNS 18 to the DDNS customer 22. The error message at block 248 corresponds to the decision block 232 and the error message at block 250 corresponds to the decision block 234.

At block 236, the DDNS 18 calls a transaction operation including a blockchain update request at a smart contract address (e.g., 0x1234) with blockchain transaction request data (e.g., OLD DTLD: mysite.store; NEW DTLD: newsite.store). The blockchain 12, which forms a portion of a blockchain backend 96, receives the blockchain update request and at block 238, obtains the necessary blockchain transaction request data (e.g., OLD DTLD: mysite.store; NEW DTLD: newsite.store) and identifies the necessary IP address information (IP 1.2.3.4). With respect to the blockchain 12 and the smart contract 14, the blockchain 12 queries the DTLD at the smart contract 14 to execute the data update. As shown by comparing DTLD map 240 and DTLD map 242 within the operations of the smart contract 14, the smart contract 14 modifies the DTLD map to reflect the update of the blockchain transaction request data (e.g., OLD DTLD: mysite.store; NEW DTLD: newsite.store; IP 1.2.3.4). The blockchain 12 then creates a response at block 244 that confirms the necessary blockchain transaction, i.e., update, has been executed. The DDNS 18 receives the update response and at block 246, a further confirmation is provided to the DDNS customer 22.

Figure 9:
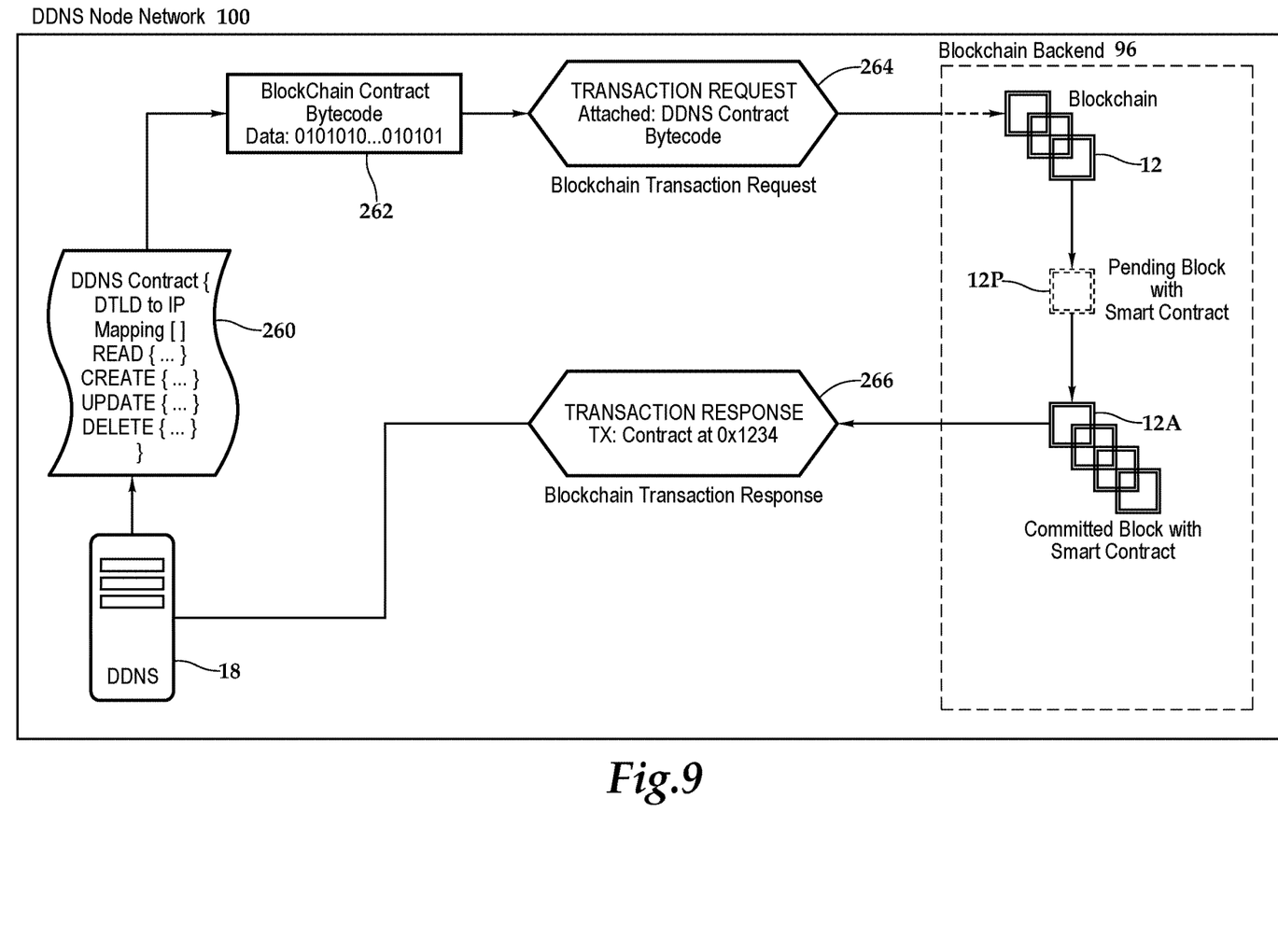

FIG. 9 depicts one embodiment of an alternative implementation of the methodology for resolving distributed top-level domain name with respective IP address information. It should be appreciated that FIG. 9 will be described with respect to smart contract submission of a distributed top-level domain name; however, the teachings presented herein are applicable to all types of domain names. At block 260, a DDNS contract is submitted by the DDNS 18 to the DDNS node network 100. At block 262, the DDNS node network 100 converts the contract code within the DDNS contract into blockchain contract bytecode. At block 264, the DDNS 18 forms a blockchain transaction request attached with DDNS contract bytecode. Then, within the blockchain backend 96, the blockchain transaction request with the attachment is sent to the blockchain 12. The blockchain then adds to the blockchain transaction into the form of a pending block with smart contract 12P. The block is committed into blockchain with smart contract appended at the new block address as shown by element 12A. At block 266, the blockchain backend 96 sends a blockchain transaction response with the new addressing information that holds the smart contract. This blockchain transaction response is received by the DDNS 18 and the DDNS 18 may now call blockchain operations (e.g., read, create, update, delete) using the block address with the attached smart contract.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for domain name address resolution, the system comprising:
   a blockchain storing a plurality of distributed domain names with respective Internet Protocol address information;
   a smart contract running on the blockchain, the smart contract being shared logic to execute operations on the blockchain;
   one or more computing devices having a memory accessible to the processor, the memory including first processor-executable instructions that, when executed, cause the processor to:
   receive a domain name request,
   analyze the domain name request,
   if the domain name request comprises a standard domain name request, serve with access to a standard domain name file, if the domain name request comprises a distributed domain name request, the distributed domain name request including the distributed domain name and Internet Protocol address information, query the blockchain for the distributed domain name from the smart contract, and receive a read response with Internet Protocol address information corresponding to the distributed domain name;

the memory including second processor-executable instructions that, when executed, cause the processor to:

receive a distributed domain name request, the distributed domain name request including the distributed domain name and Internet Protocol address information, query the blockchain for the distributed domain name from the smart contract, receive a read response indicating availability of the distributed domain name, request from the smart contract a blockchain mapping of the distributed domain name, and receive a mapping response indicating the blockchain mapping of the distributed domain name to the Internet Protocol address information; and the memory including third processor-executable instructions that, when executed, cause the processor to:

receive a request to update a distributed domain name, the request including existing Internet Protocol address information and updated Internet Protocol address information, query the blockchain for the distributed domain name from the smart contract, receive a read response with existing Internet Protocol address information corresponding to the distributed domain name, request from the smart contract an updated blockchain mapping of the distributed domain request, and receive a mapping response indicating the blockchain mapping of the distributed domain name to the updated Internet Protocol address information, wherein each request is verified according to a header, a nonce, and the data of the request by a blockchain miner.

2. The system as recited in claim 1, wherein the memory further includes fourth processor-executable instructions that, when executed, cause the processor to:

receive a request to delete a distributed domain name,
query the blockchain for the distributed domain name from the smart contract, receive a read response with Internet Protocol address information corresponding to the distributed domain name, request from the smart contract deletion of the distributed domain name from the blockchain, and receive a deletion response indicating deletion of the distributed domain name from the blockchain.

3. The system as recited in claim 1, wherein the one or more computing devices further comprise a server.

4. The system as recited in claim 1, wherein the one or more computing devices further comprise a distributed computing network.

5. The system as recited in claim 1, wherein the one or more computing devices further comprise an application specific integrated circuit.

6. The system as recited in claim 1, wherein the one or more computing devices further comprise a field programmable gate array.

7. A method for domain name address resolution, the method comprising:

executing, in response to a read request, a read operation, the read operation including:
receiving a domain name request,
analyzing the domain name request,
serving, if the domain name request comprises a standard domain name request, with access to a standard domain name file,
querying, if the domain name request comprises a distributed domain name request, a blockchain for the distributed domain name from a smart contract, the distributed domain name request including the distributed domain name and Internet Protocol address information, the blockchain storing a plurality of distributed domain names with respective Internet Protocol address information, the smart contract running on the blockchain, the smart contract being shared logic to execute operations on the blockchain, and
receiving a read response with Internet Protocol address information corresponding to the distributed domain name;

executing, in response to a create request, a create operation, the create operation including:
receiving a distributed domain name request, the distributed domain name request including the distributed domain name and Internet Protocol address information,
querying the blockchain for the distributed domain name from the smart contract,
receiving a read response indicating availability of the distributed domain name,
requesting from the smart contract a blockchain mapping of the distributed domain name, and
receiving a mapping response indicating the blockchain mapping of the distributed domain name to the Internet Protocol address information; and executing, in response to an update request, an update operation, the update operation including:
receiving a request to update a distributed domain name, the request including existing Internet Protocol address information and updated Internet Protocol address information,
querying the blockchain for the distributed domain name from the smart contract,
receiving a read response with existing Internet Protocol address information corresponding to the distributed domain name,
requesting from the smart contract an updated blockchain mapping of the distributed domain request, and
receiving a mapping response indicating the blockchain mapping of the distributed domain name to the updated Internet Protocol address information, wherein each request is verified according to a header, a nonce, and the data of the request by a blockchain miner.

8. The method as recited in claim 7, the method further comprising:

executing, in response to a delete request, a delete operation, the deletion operation including:
receiving a request to delete a distributed domain name,
querying the blockchain for the distributed domain name from the smart contract, receiving a read response with Internet Protocol address information corresponding to the distributed domain name, requesting from the smart contract deletion of the distributed domain name from the blockchain, and receiving a deletion response indicating deletion of the distributed domain name from the blockchain.

9. A system for domain name address resolution, the system comprising:

non-transitory memory accessible to a processor, the non-transitory memory including first processor-executable instructions that, when executed, by the processor cause the system to:

a blockchain storing a plurality of distributed domain names with respective Internet Protocol address information;

a smart contract running on the blockchain, the smart contract being shared logic to execute operations on the blockchain;

receive a domain name request, analyze the domain name request, if the domain name request comprises a standard domain name request, serve with access to a standard domain name file, if the domain name request comprises a distributed domain name request, the distributed domain name request including the distributed domain name and Internet Protocol address information, query the blockchain for the distributed domain name from the smart contract, the blockchain storing a plurality of distributed domain names with respective Internet Protocol address information, the smart contract running on the blockchain, the smart contract being shared logic to execute operations on the blockchain, and receive a read response with Internet Protocol address information corresponding to the distributed domain name;

the non-transitory memory including second processor-executable instructions that, when executed, by the processor cause the system to:

receive a distributed domain name request, the distributed domain name request including the distributed domain name and Internet Protocol address information, query the blockchain for the distributed domain name from the smart contract, receive a read response indicating availability of the distributed domain name, request from the smart contract a blockchain mapping of the distributed domain name, and receive a mapping response indicating the blockchain mapping of the distributed domain name to the Internet Protocol address information; and the non-transitory memory including third processor-executable instructions that, when executed, by the processor cause the system to:

receive a request to update a distributed domain name, the request including existing Internet Protocol address information and updated Internet Protocol address information, query the blockchain for the distributed domain name from the smart contract, receive a read response with existing Internet Protocol address information corresponding to the distributed domain name, request from the smart contract an updated blockchain mapping of the distributed domain request, and receive a mapping response indicating the blockchain mapping of the distributed domain name to the updated Internet Protocol address information, wherein each request is verified according to a header, a nonce, and the data of the request by a blockchain miner.

10. The system as recited in claim 9, wherein the memory further includes fourth processor-executable instructions that, when executed, cause the processor to:

receive a request to delete a distributed domain name, query the blockchain for the distributed domain name from the smart contract, receive a read response with Internet Protocol address information corresponding to the distributed domain name, request from the smart contract deletion of the distributed domain name from the blockchain, and receive a deletion response indicating deletion of the distributed domain name from the blockchain.

11. The system as recited in claim 9, wherein the non-transitory memory is stored on a server.

12. The system as recited in claim 9, wherein the non-transitory memory is stored in a distributed computing network.

13. The system as recited in claim 9, wherein the processor further comprises an application specific integrated circuit.

14. The system as recited in claim 9, wherein the processor further comprises a field programmable gate array.

\* \* \* \* \*

UNITED STATES PATENT AND TRADEMARK OFFICE
CERTIFICATE OF CORRECTION

PATENT NO. : 10,880,260 B1
APPLICATION NO. : 16/906984
DATED : December 29, 2020
INVENTOR(S) : Scott Gaydos and Robert Otting It is certified that error appears in the above-identified patent and that said Letters Patent is hereby corrected as shown below:

In the Specification
In Column 3, Line 18, the second occurrence of "blockchain" should read as --blockchain 12--.
In Column 3, Line 41, "contract" should read as --contract 14--.
In Column 3, Line 49, "buses" should read as --buses 44--.
In Column 4, Line 1, "DDNS" should read as --DDNS 18--.
In Column 5, Line 29, "ASIC" should read as --ASIC 50--.
In Column 5, Line 46, please insert --of-- before "hardware.".
In Column 6, Line 17, please insert --a-- after "receive.".
In Column 6, Line 19, please insert --by-- after "serviced," and "Instead" should read as --instead--.
In Column 6, Line 65, "customer" should read as --customer 22--.

Signed and Sealed this
Nineteenth Day of September, 2023

Katherine Kelly Vidal
*Director of the United States Patent and Trademark Office*